US00H002243H

(19) United States
(12) Statutory Invention Registration
Stang

(10) Reg. No.: US H2243 H
(43) Published: Aug. 3, 2010

(54) METHOD AND APPARATUS FOR PROVIDING LEAK-BEFORE-BURST FAILURE OF A PRESSURIZED COMPONENT

(75) Inventor: Darren L. Stang, Covington, WA (US)

(73) Assignee: OMAX Corporation, Kent, WA (US)

(21) Appl. No.: 11/999,881

(22) Filed: Dec. 6, 2007

(51) Int. Cl.
*G01M 3/04* (2006.01)

(52) U.S. Cl. ..... 73/49.2
(58) Field of Classification Search ..... 73/49.2; 220/203.01, 203.08, 745, 89.1; 703/1

See application file for complete search history.

(56) References Cited

U.S. PATENT DOCUMENTS

2003/0146229 A1 * 8/2003 Munoz ..... 220/745
2005/0107963 A1 * 5/2005 Campbell ..... 702/42
2009/0320565 A1 * 12/2009 Strang ..... 73/49.2

* cited by examiner

*Primary Examiner*—Dan Pihulic
(74) *Attorney, Agent, or Firm*—Graybeal Jackson Haley LLP

(57) ABSTRACT

In a pressure vessel, pressure fitting, or pressure component, service use may result in the propagation of fatigue cracks. According to embodiments, a leak channel may be designed and formed to cause a pressurized fluid nominally contained by the pressure member to leak after formation of a fatigue crack, rather than undergoing a more catastrophic burst failure. According to an embodiment, a method is taught for determining the propensity of fatigue cracks to form, determining the location of the possible fatigue cracks, and determining a location for a leak channel, leak hole, weep hole, etc. for preventing burst failure. According to an embodiment, a computer program performs steps to design leak channels for prevention of burst failures in favor of leak-before-burst (LBB) failures.

4 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD AND APPARATUS FOR PROVIDING LEAK-BEFORE-BURST FAILURE OF A PRESSURIZED COMPONENT

TECHNICAL FIELD

This disclosure relates to improving the safety of pressure components and vessels by providing a preferential failure mode wherein leakage of a pressurized fluid occurs prior to and/or in alternative to burst failure. In particular, this disclosure relates to providing an intercepting fluid leak feature in a crack propagation path.

BACKGROUND

For vessels exposed to repeated internal pressure cycles, annular cracks typically grow outward from some type of discontinuity such as a blind end closure, threaded end closure, etc. The cracks continue to propagate toward the outer surface of the vessel. Failure occurs when the remaining intact material can no longer withstand the pressure load being exerted on the area exposed by the crack. The eventual failure (burst) may be violent since the stored energy of the system is quickly released and in some cases material is ejected from the failure point. In general, designs in which annular fatigue cracks grow due to pressure cycling should be avoided. However, on occasion designs of this type are necessary. FIG. 1 is a cross-sectional view illustrating a pressure member 102 with a typical annular crack 104 originating at the radius of a blind end closure within the pressure member, as may have been experienced according to the prior art.

One reason burst type failures can be hazardous is related to the possible ejection of material. FIG. 2 is a perspective view of a three pound piece of material 202 that was ejected during such a failure. The stored energy within the system when the pressure member failed was approximately 1,000,000 ft-lbs. The failed surface of the piece 202 illustrates classic annular crack growth 204 corresponding to fatigue, and eventual failure. The crack initiated at a discontinuity 206 created at the intersection of two bores.

OVERVIEW

When designing pressure vessels, pressure fittings, or pressure components (hereinafter referred to as pressure members) subjected to fatigue loading, it may be desirable that such vessels fail in a "leak-before-burst" (LBB) mode of failure. A LBB type of failure assures that material is not ejected or projected from the failure point. Pressure systems such as ultra-high pressure (UHP) systems used for water jet or abrasive jet cutting can contain significant stored energy and, from a safety point of view, it is important that this energy is not used to propel object(s) from the failure point According to embodiments, methods may be used to design members to prevent cracks, such as circumferential cracks, from growing to a point where a hazardous burst mode of failure takes place. Approaches taught herein provide methods that result in a much safer LBB mode of failure.

According to embodiments, a leak channel is designed into a wall of the pressure member in a path prone to crack propagation. The leak channel may provide a path for fluid release from the pressure vessel or pressure fitting.

According to embodiments, pressure vessels, pressure fittings, etc. include one or more features that provide a LBB mode of failure.

According to an embodiment, the appearance of a leak in a pressure member may act as a warning to operating personnel to release pressure from the pressure member and to repair or replace the pressure member.

According to an embodiment, a leak channel may provide a pressure release path operable to substantially prevent a subsequent burst failure in a pressure member.

According to an embodiment a leak channel may comprise a hole drilled into and partially through the wall of a pressure member. The location of the hole may be determined using computer modeling wherein the location is chosen to coincide with a location determined to be subject to burst failure. The location determined to be subject to burst failure may coincide with a crack initiation feature. The location determined to be subject to burst failure may coincide with a predicted fatigue failure location.

DETAILED DESCRIPTION

Figure 3:
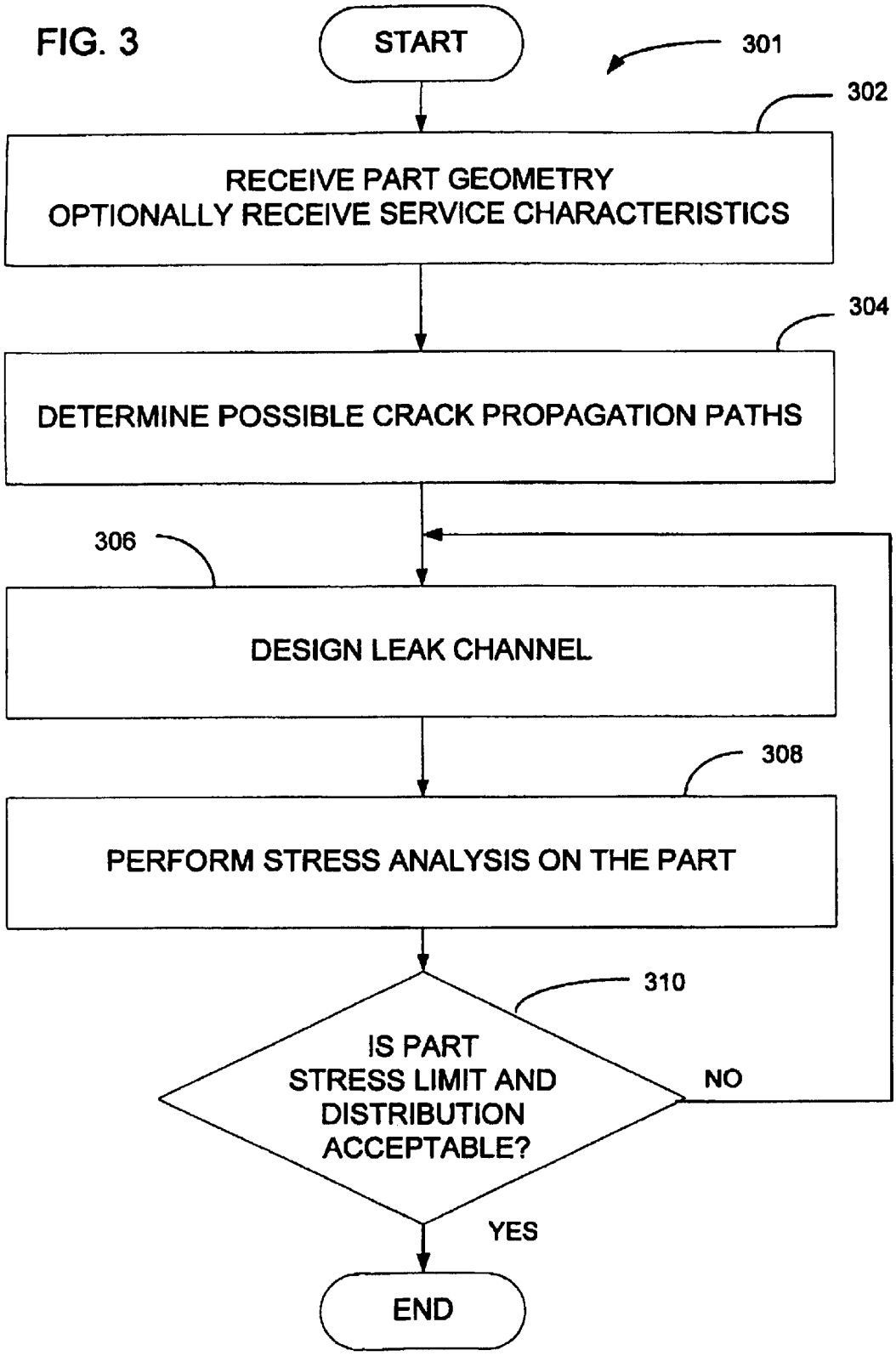
FIG. 3 is a flow chart illustrating a method according to an embodiment for designing a pressure vessel or pressure fitting for a LBB failure mode.

FIG. 3 illustrates a method 301 for designing a pressure member configured, if it fails, to undergo a LBB failure mode. In step 302, the geometry of the pressure member is received, along with a description of material and/or material characteristics. The geometry may be received as a physical part; a solid model; a wireframe model; a mesh; a 2D planar, half-planar, or quarter-planar model; etc.

Optionally, service characteristics such as maximum pressure, pressure cycling rate and characteristics, service life are also received in step 302.

Proceeding to step 304, a possible crack propagation path is determined. A possible crack propagation path may be determined from laboratory results such as one or more actual crack propagation paths in one or more pressure members tested to failure, or (less desirably) actual field failures. Alternatively, a crack propagation path may be determined using a computer program or subroutine, or by hand calculation applying Linear Elastic Fracture Mechanics (LEFM) analysis. Approaches to performing LEFM analysis may be found in ASME BOILER AND PRESSURE VESSEL CODE, 2003, Section 8, Division 3, entitled Alternative Rules for Construction of High Pressure Vessels, incorporated by reference herein. Generally speaking, LEFM analysis may indicate a probable direction followed by a fatigue-induced crack and indicate a maximum depth the crack may reach before catastrophic failure occurs. Often such catastrophic failure (i.e. burst mode failure) may be associated in an increase in surface area attributable to a fatigue crack (and hence an increase in total pressure in a region of the pressure member) that causes the material stress limits to be exceeded through the remaining wall thickness.

LEFM analysis is used to select a depth close enough to the inside diameter or inside wall so a LBB condition is created.

Figure 1:
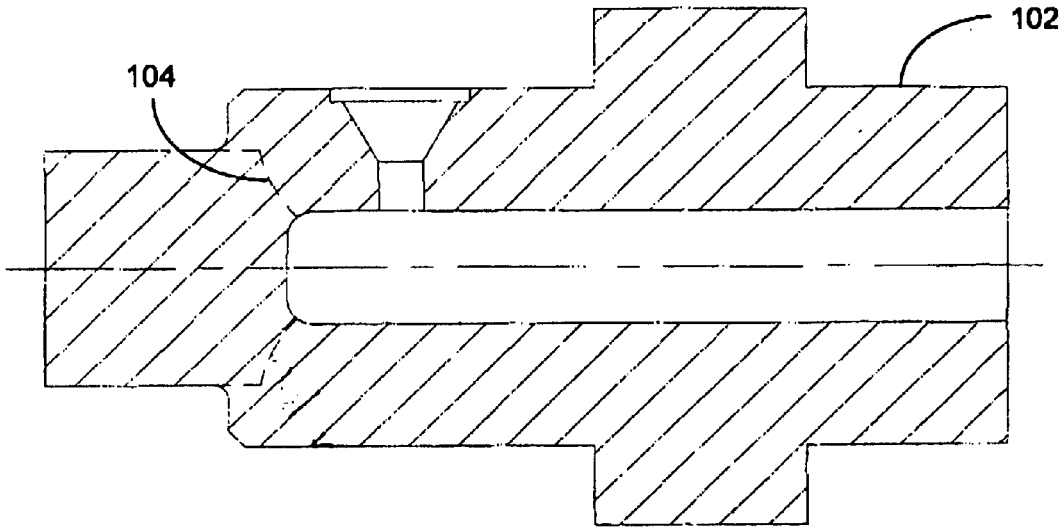
FIG. 1 is a cross sectional view of a pressure fitting made according to the prior art where a fatigue crack may grow until burst failure occurs.
Figure 2:
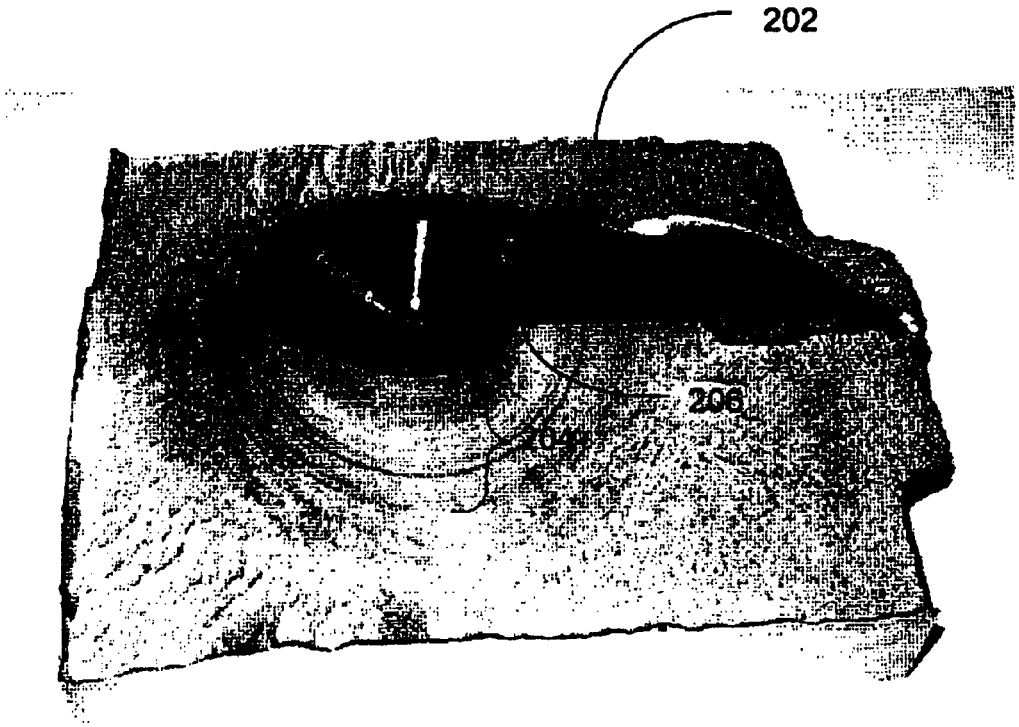
FIG. 2 is a perspective view of a piece of material that was ejected during a burst failure from a pressure fitting or pressure vessel made according to the prior art.

Proceeding to step 306, a leak channel is designed to intersect or intercept the crack propagation path at the selected depth. Frequently, a crack propagation path may be exhibited as an annular crack 104 as indicated in FIG. 1 above. Other systems may be prone to fatigue cracks that propagate in other directions. Often, the most probable fatigue crack propagation paths are substantially parallel. To intersect each of a plurality of possible crack propagation paths, for the purpose of maximizing the chance of intercepting an actual path, it may be desirable to design a leak channel to run substantially perpendicular to a range of crack propagation paths.

Figure 4:
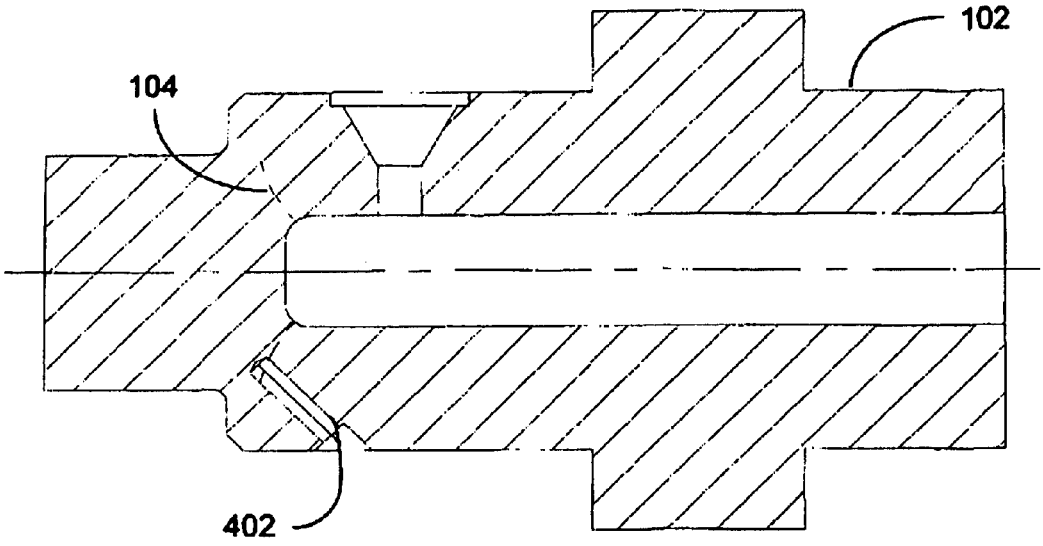
FIG. 4 is a cross sectional view of a pressure fitting made according to an embodiment where a growing fatigue crack is intercepted by a feature that provides LBB failure.

Referring to FIG. 4, an annular crack propagation path 104 in a pressure member 102 is shown. A leak channel 402 may be formed as a cylindrical hole in the wall of the pressure member 102, the leak channel 402 being placed substantially perpendicular to the annular crack propagation path. By such placement, the leak channel intersects a plurality of substantially parallel possible crack propagation paths and maximizes the likelihood of the leak channel intercepting an actual crack as it progresses.

As indicated, a leak channel may be formed as one or more drilled holes. Alternatively, the leak channel may take alternative shapes. It may be desirable to shapes based on fabrication ease, and also based on minimization of discontinuities such as corners. Accordingly, cylindrical or ovoid shapes may be desirable in some embodiments. According to some embodiments, the size of the hole forming the leak channel should be kept as large as possible to prevent a fluid "jet" being developed when a LBB failure occurs. According to some embodiments, the leak channel may be formed as a labyrinth (such as by using a plurality of drilled-and-filled holes) to reduce the tendency for an unimpeded pressurized fluid stream from entering the environment.

A leak channel may be designed manually. Alternatively, if all or part of the process 301 is embodied as a computer program, the placement of the leak channel may be made automatically or interactively.

Returning now to FIG. 3, the process next proceeds to step 308, where a stress analysis is performed on the resultant pressure member with leak channel design. A number of different approaches known to the art may be used to perform the stress analysis. According to one embodiment, a mesh is automatically generated and finite element analysis (FEA) is performed. To maximize sensitivity and/or accuracy, it may be desirable to generate a relatively fine mesh adjoining and near the leak channel and/or the crack propagation path.

One purpose of FEA is to select a position far enough away from the inside diameter such that the hole does not detrimentally effect the stress on the part. During the stress analysis step 308, a simplifying assumption may be made to base the stress calculation on an uncompromised part, i.e., a pressure member that has no fatigue-induced cracking and is thus in a "like-new" state.

Proceeding to step 310, the results of FEA are analyzed. If the peak and distribution of stress concentrations remain within tolerable limits, the process may be considered complete and the LBB design output. Alternatively, the process may loop back to step 306, wherein an alternative leak channel design may be generated.

While the process of FIG. 3 may have been generally described above as a series of discrete, designer-implemented steps, some or all of the process 301 may alternatively be designed as a computer-aided design (CAD) computer program.

The preceding overview, brief description of the drawings, and detailed description describe exemplary embodiments in a manner intended to foster ease of understanding by the reader. Other structures, methods, and equivalents may be within the scope of the invention. As such, the scope of the invention described herein shall be limited only by the claims.

What is claimed is:

1. A method for designing a pressure member having a leak-before-burst mode of failure, comprising:

determining a crack propagation path in a pressure member; and determining a leak channel location that intersects the crack propagation path.

2. A method for fabricating a pressure member having a leak-before-burst mode of failure, comprising:

fabricating a pressure member having a potential crack propagation path; and forming in the pressure member a leak channel that intersects the potential crack propagation path.

3. A pressure member having a leak-before-burst mode of failure, comprising:

a pressure member wall having at least one potential crack propagation path; and a leak channel formed in the pressure member wall in a location that intercepts the potential crack propagation path.

4. A computer-readable medium carrying computer instructions for carrying out the steps comprising:

receiving a pressure-member geometry and material properties;

determining one or more possible fatigue crack propagation paths using LEFM analysis;

determining a leak channel that intersects the one or more possible fatigue crack propagation paths; and performing stress analysis using FEA to verify that the designed leak channel does not increase stress concentration in the pressure member.

* * * * *